(12) United States Patent
Kempf et al.

(10) Patent No.: US 11,268,781 B1
(45) Date of Patent: Mar. 8, 2022

(54) CROSSBOW WITH INTEGRAL COCKING WORM GEAR DRIVEN SPOOL

(71) Applicant: Archery Innovators, Tiffin, IA (US)

(72) Inventors: James J. Kempf, Coralville, IA (US); Rex E. Isenhower, Mount Pleasant, IA (US)

(73) Assignee: ARCHERY INNOVATORS, LLC, Tiffin, IA (US)

( * ) Notice: Subject to any disclaimer, the term of this patent is extended or adjusted under 35 U.S.C. 154(b) by 7 days.

(21) Appl. No.: 16/910,327

(22) Filed: Jun. 24, 2020

Related U.S. Application Data

(63) Continuation-in-part of application No. 16/812,874, filed on Mar. 9, 2020.

(51) Int. Cl.
*F41B 5/12* (2006.01)
*F41B 5/14* (2006.01)

(52) U.S. Cl.
CPC .............. *F41B 5/12* (2013.01); *F41B 5/1403* (2013.01); *F41B 5/1484* (2013.01)

(58) Field of Classification Search
CPC .................................. F41B 5/12; F41B 5/123
See application file for complete search history.

(56) References Cited

U.S. PATENT DOCUMENTS

| | | | | |
|---|---|---|---|---|
| 5,220,906 | A * | 6/1993 | Choma | F41B 5/12 124/25 |
| 8,950,385 | B1 * | 2/2015 | Khoshnood | F41B 5/12 124/25 |
| 9,052,154 | B1 * | 6/2015 | Prior | F41B 5/126 |
| 9,341,432 | B1 * | 5/2016 | Wohleb | F16H 25/20 |
| 9,404,706 | B2 * | 8/2016 | Khoshnood | F41B 5/12 |
| 9,719,749 | B1 * | 8/2017 | Prior | F41B 5/0094 |
| 9,958,232 | B1 * | 5/2018 | Egerdee | F41B 5/1403 |
| 10,139,188 | B2 * | 11/2018 | Shaffer | F41B 5/12 |
| 10,900,737 | B1 * | 1/2021 | Hensel | F41B 5/1469 |
| 10,900,738 | B1 * | 1/2021 | Hensel | F41B 5/123 |

* cited by examiner

*Primary Examiner* — John A Ricci
(74) *Attorney, Agent, or Firm* — Donald J. Ersler

(57) ABSTRACT

A worm gear assembly wherein the worm wheel gear is axially coupled with a shaft and a coupler. The coupler may be selectable from a first position locked with the wheel gear and the shaft to a second position unlocked with the wheel gear and the shaft. The coupler may be interactive with the worm wheel gear, or another component coupled with the shaft.

15 Claims, 19 Drawing Sheets

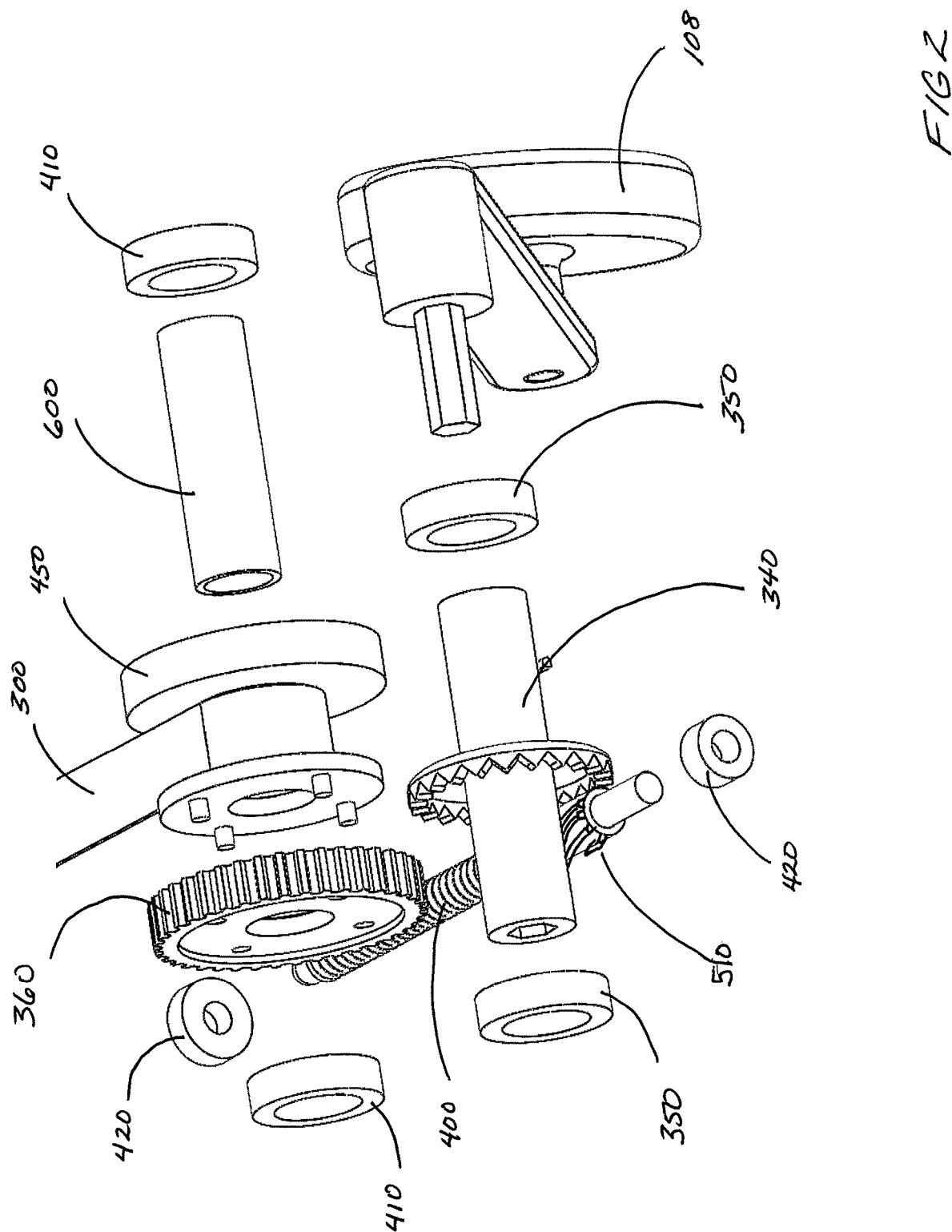

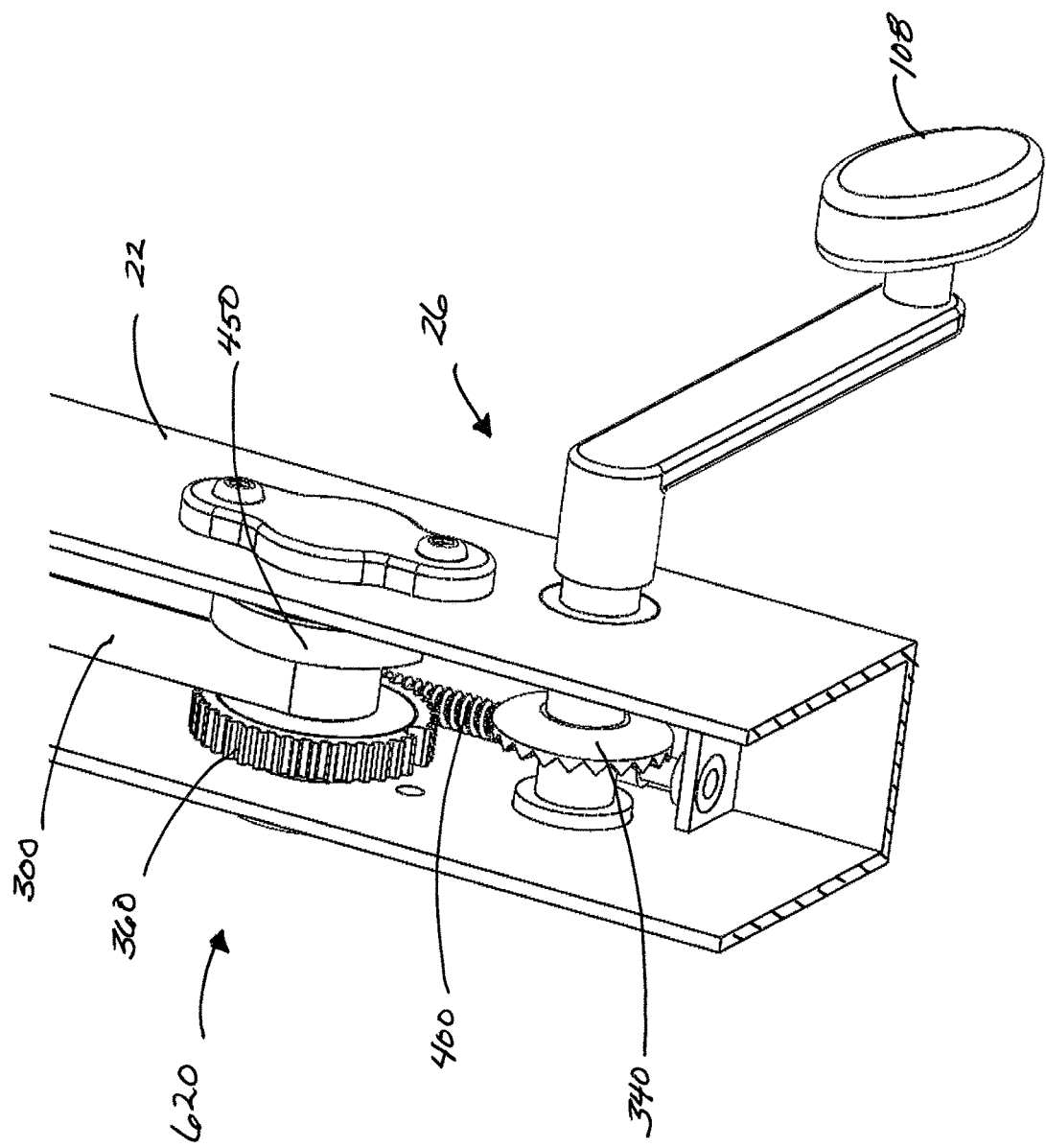

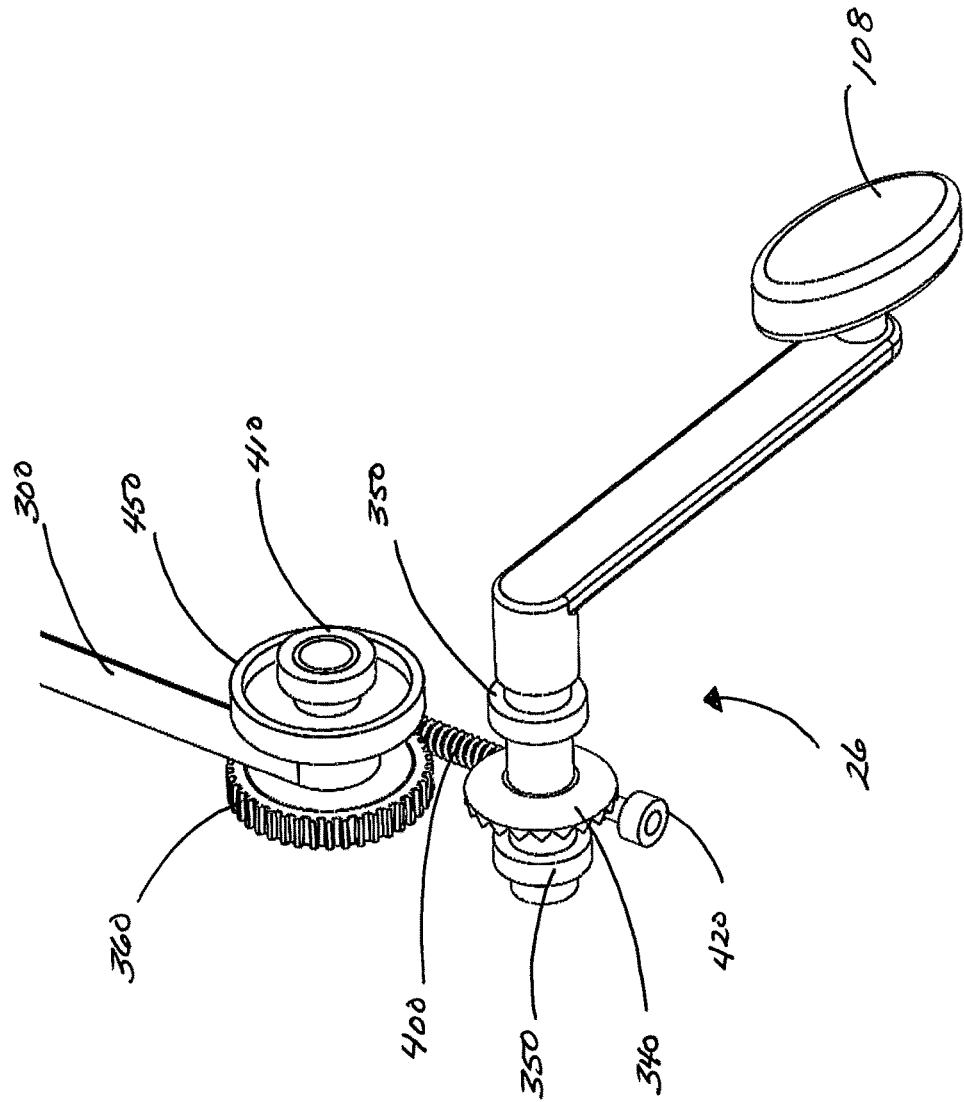

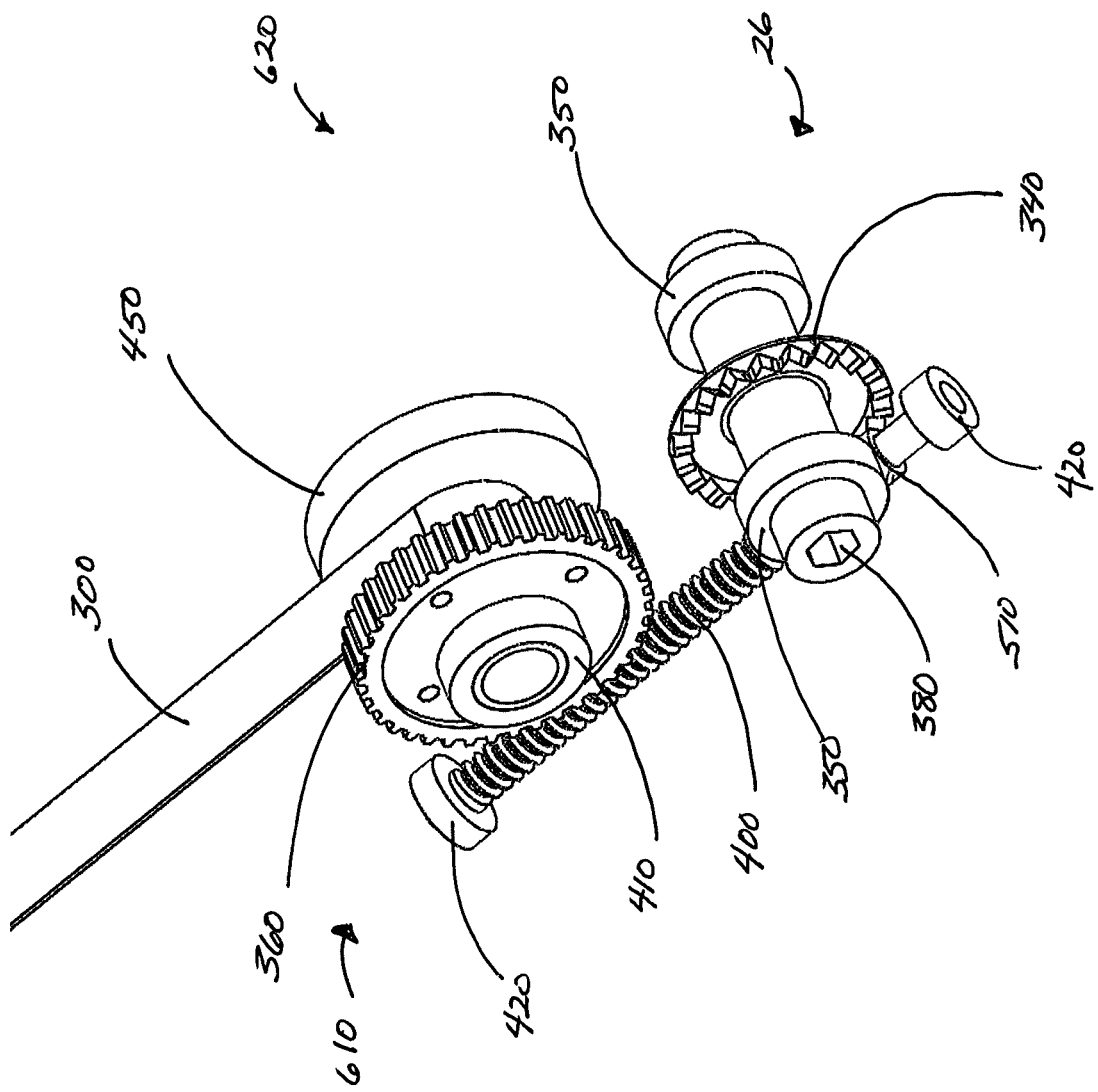

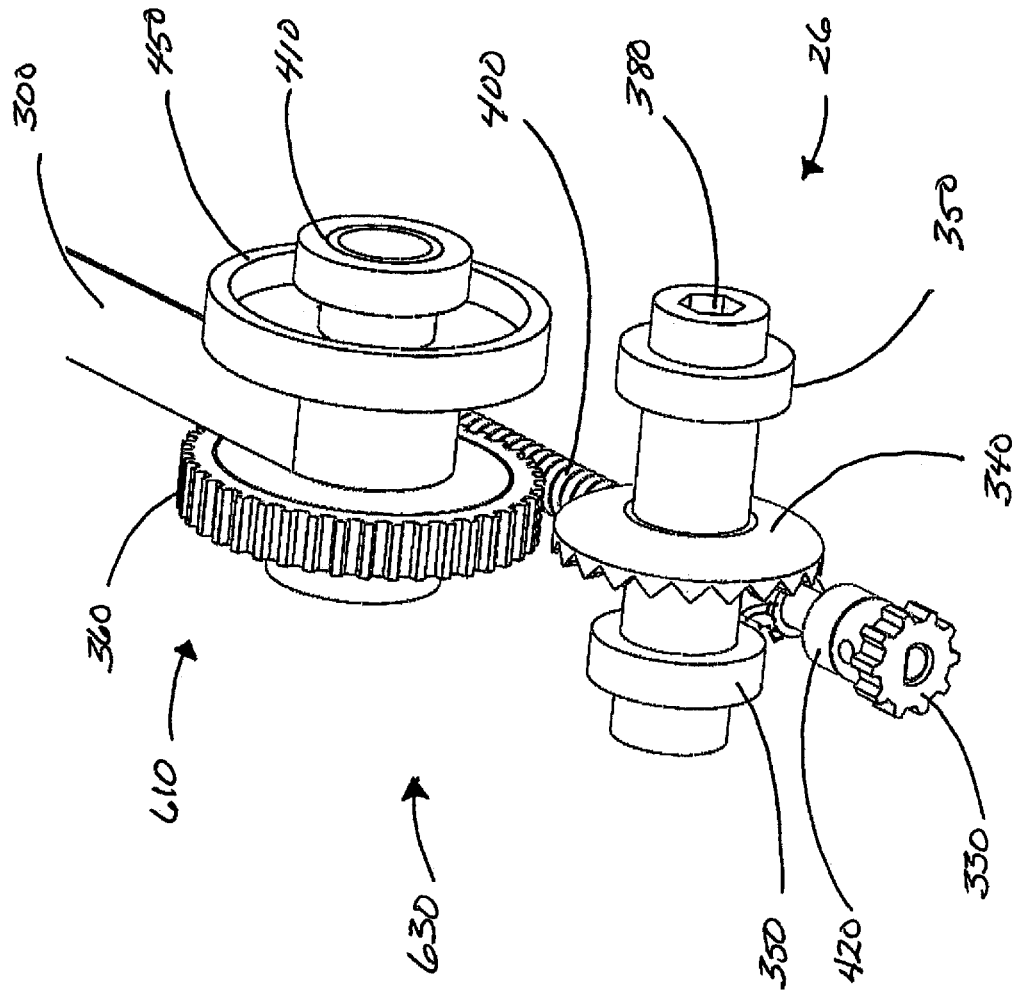

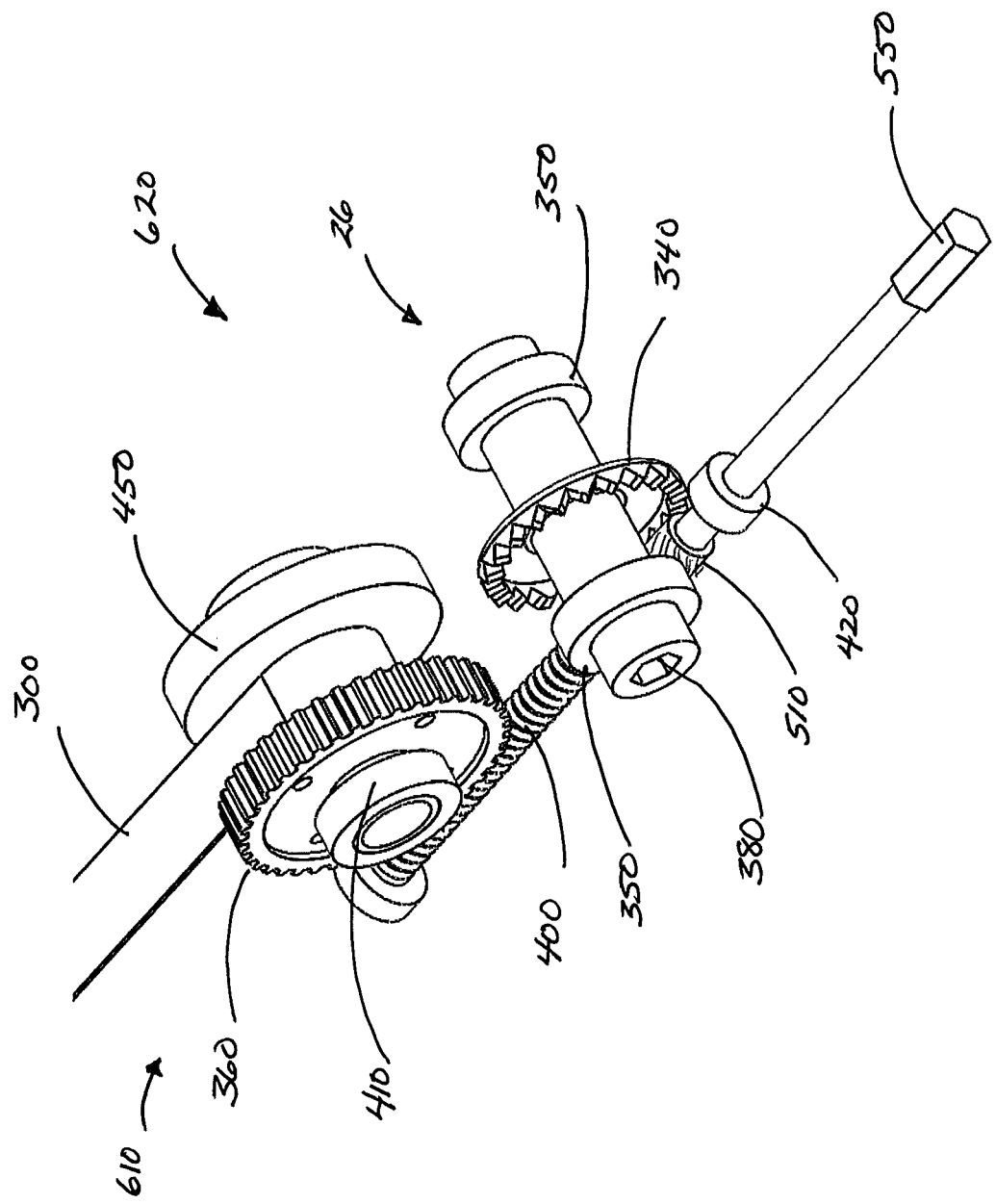

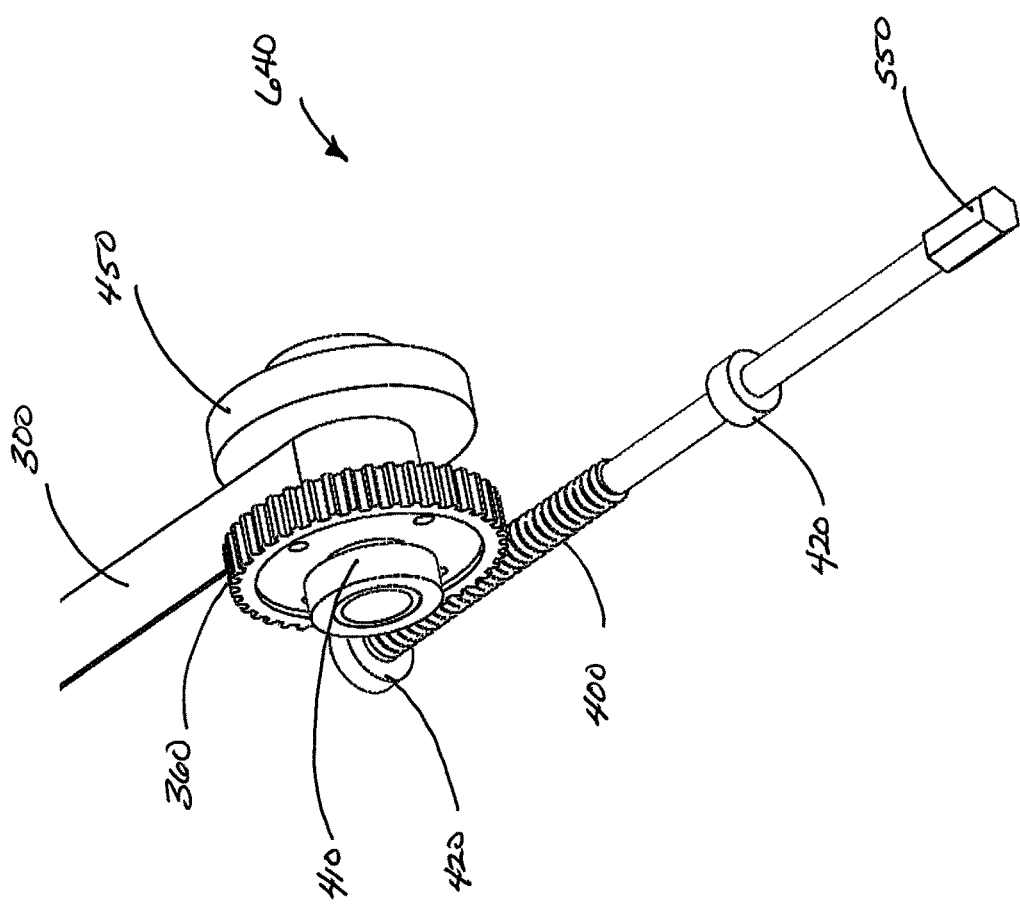

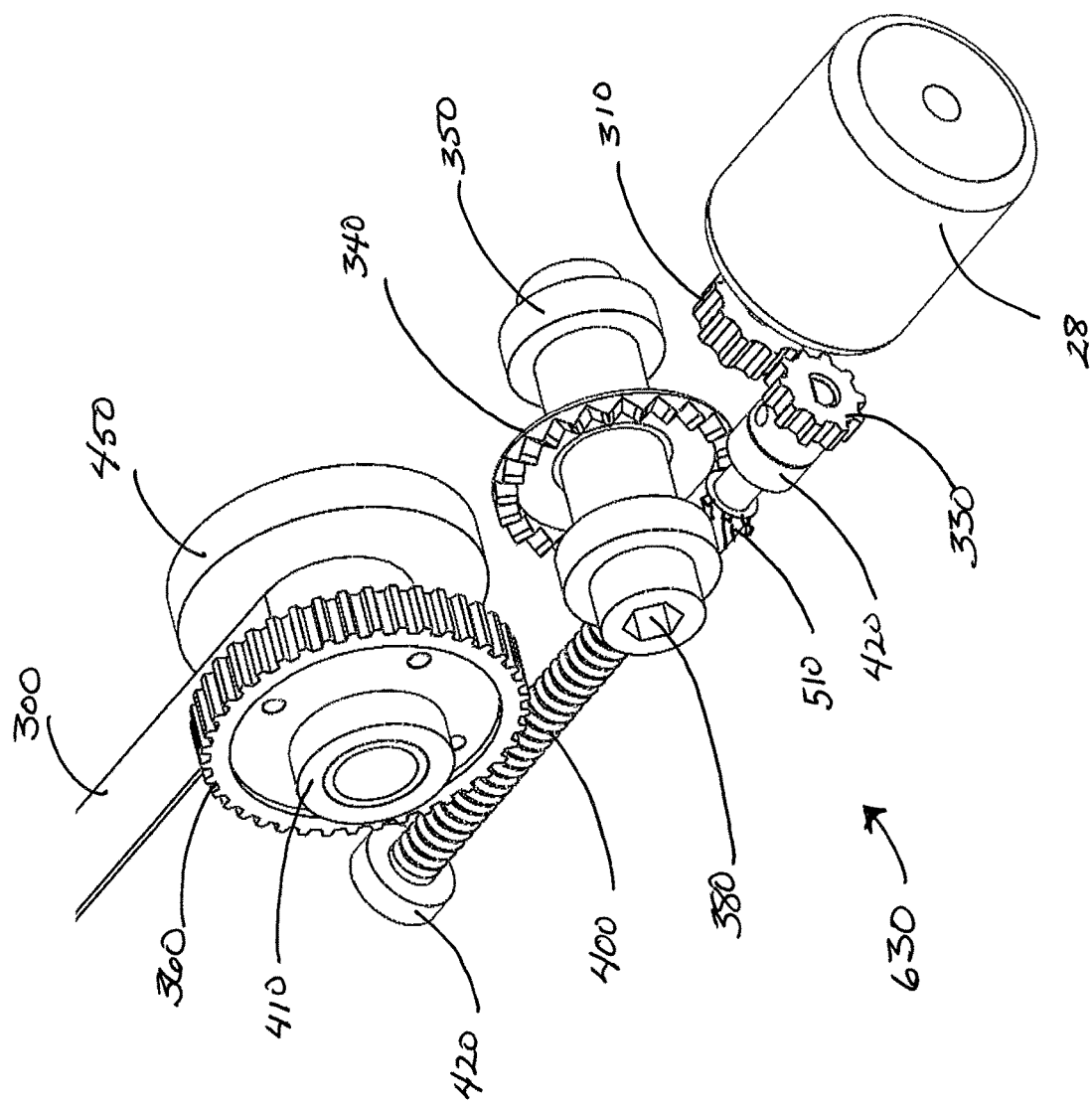

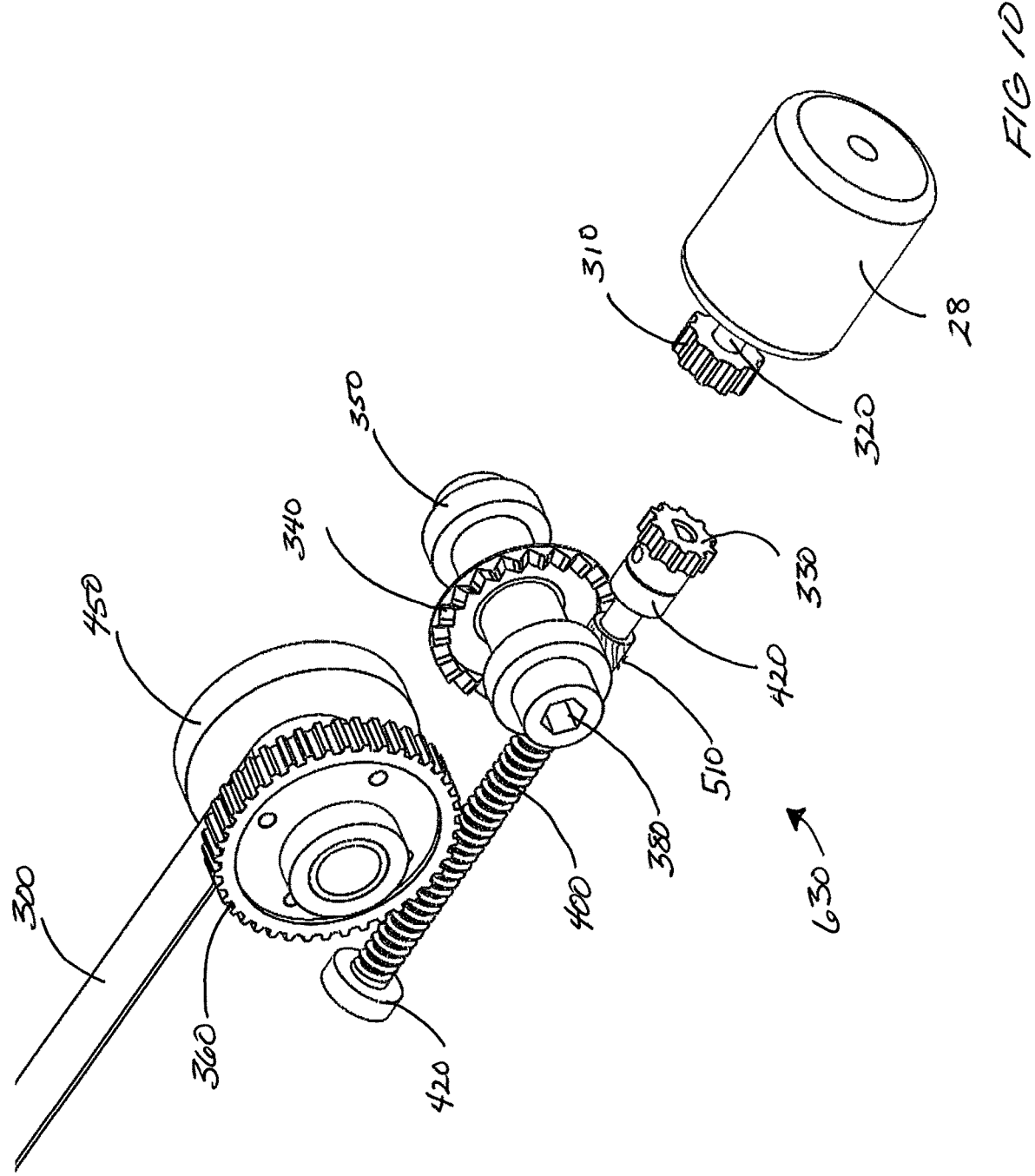

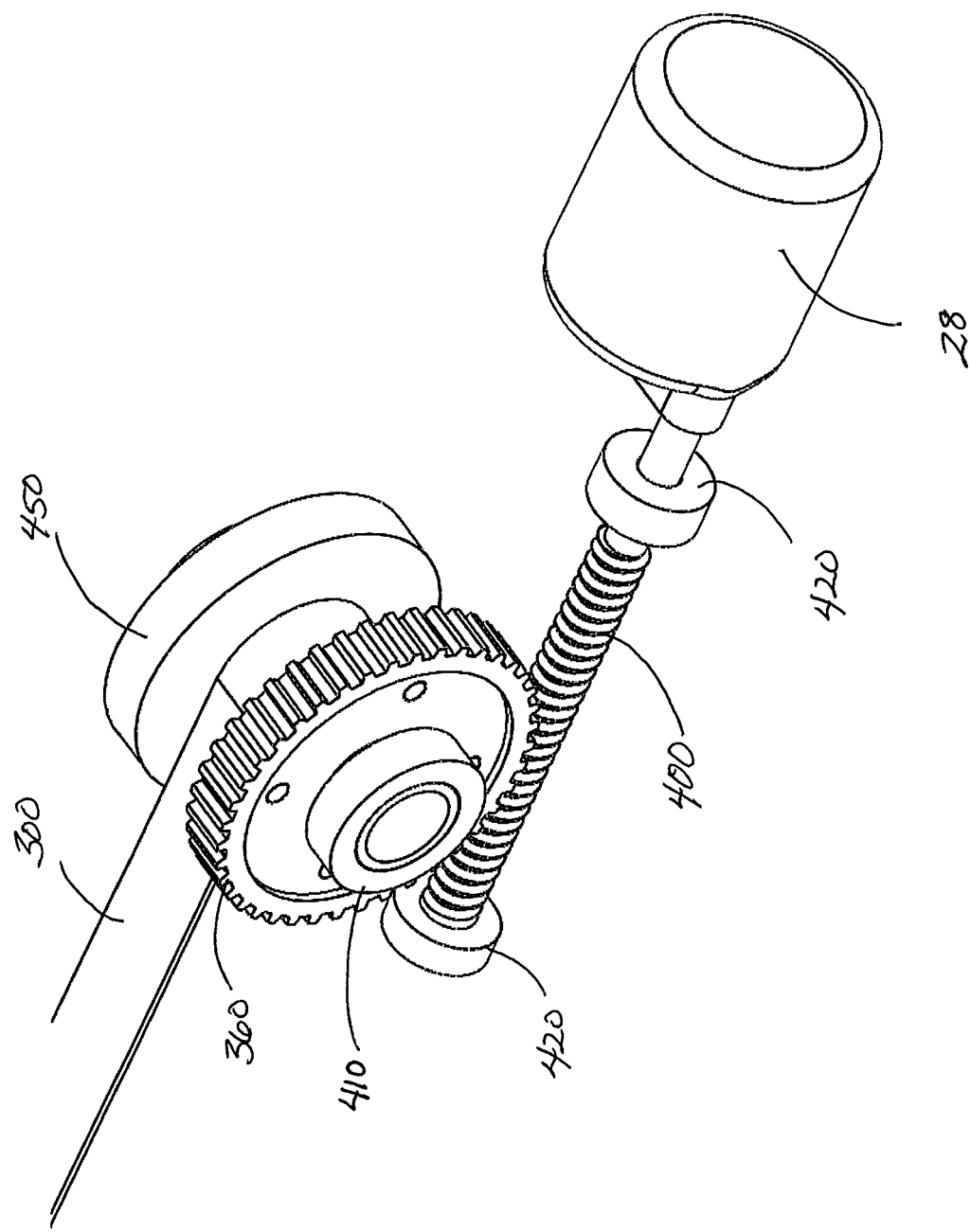

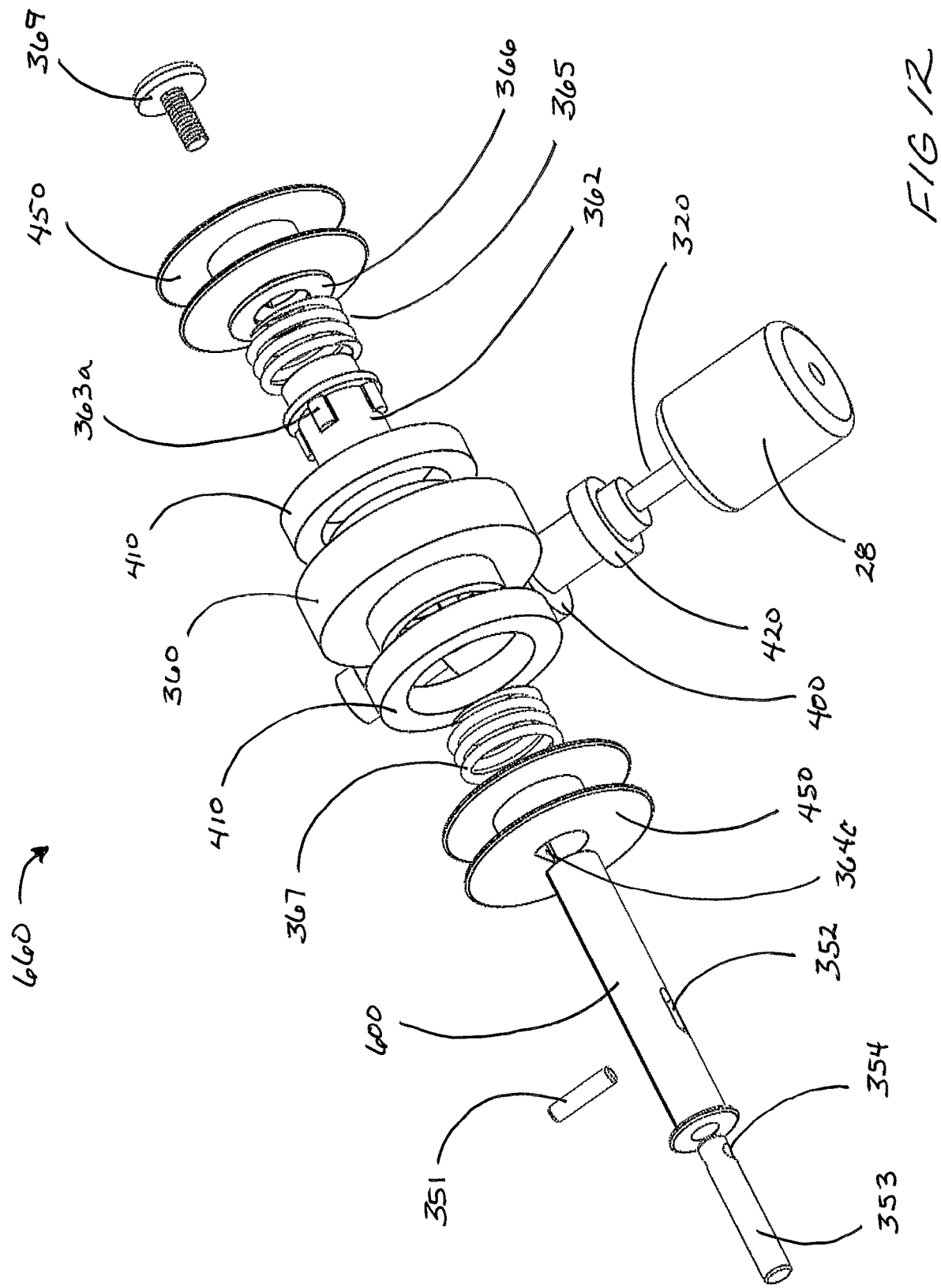

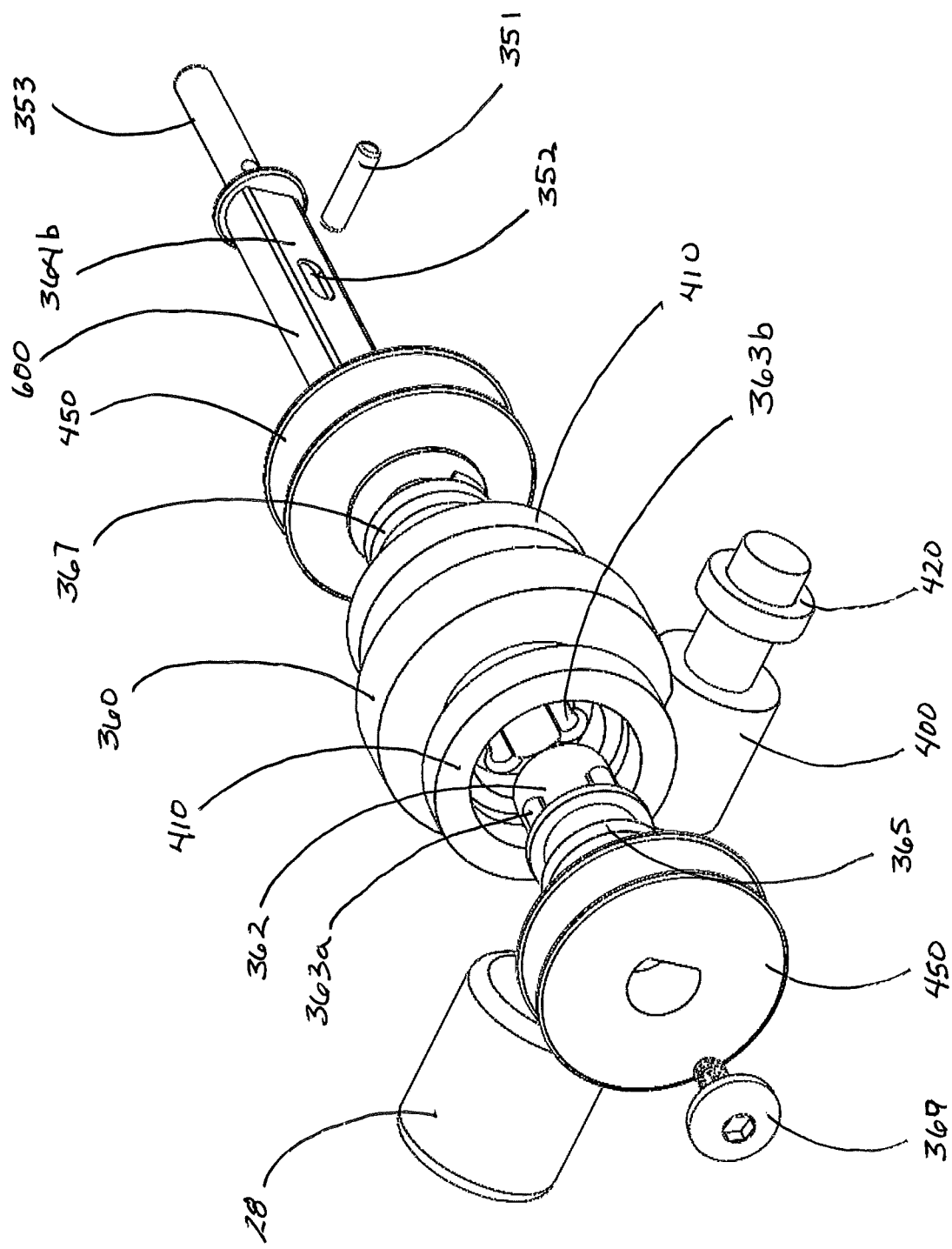

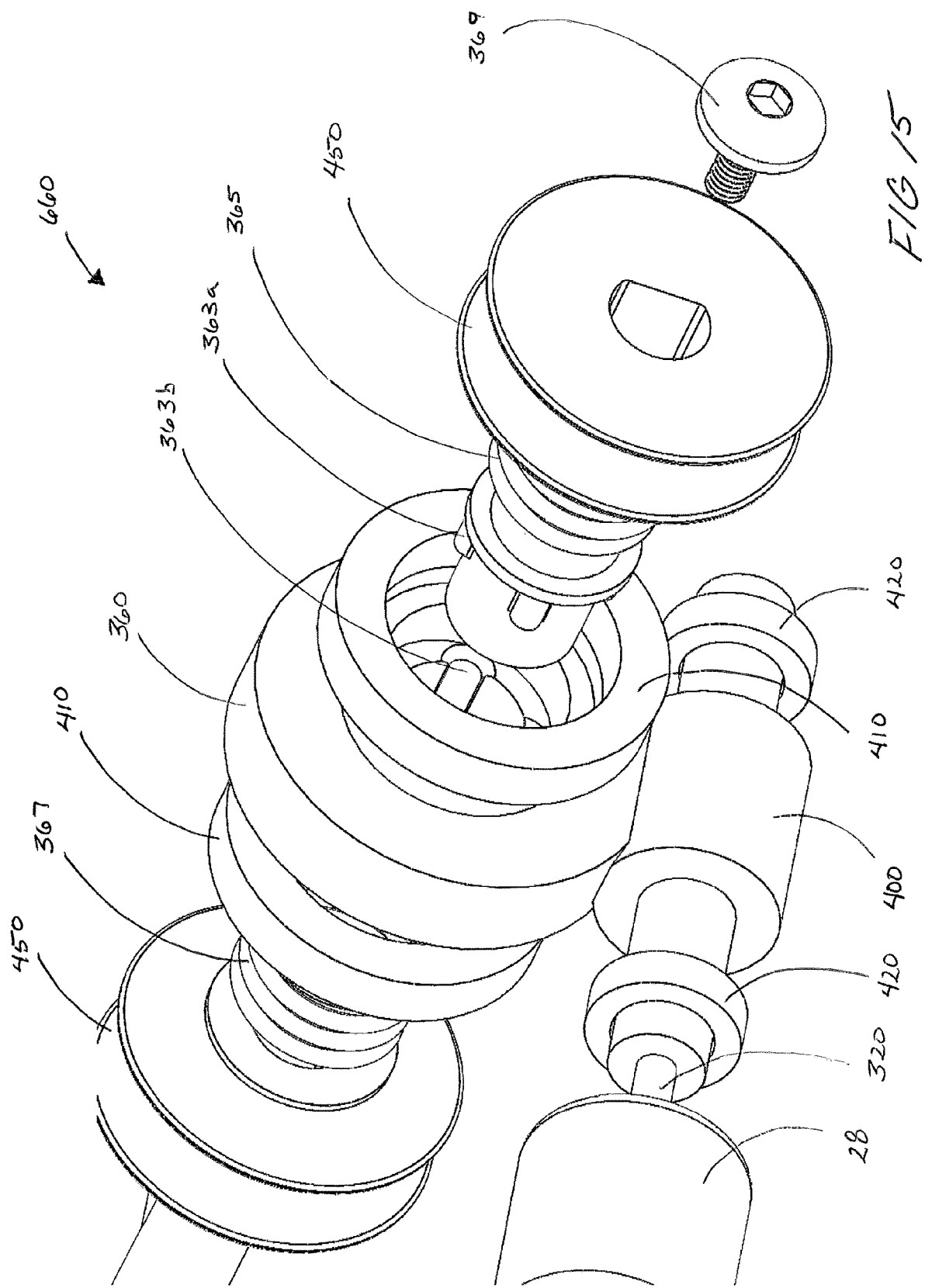

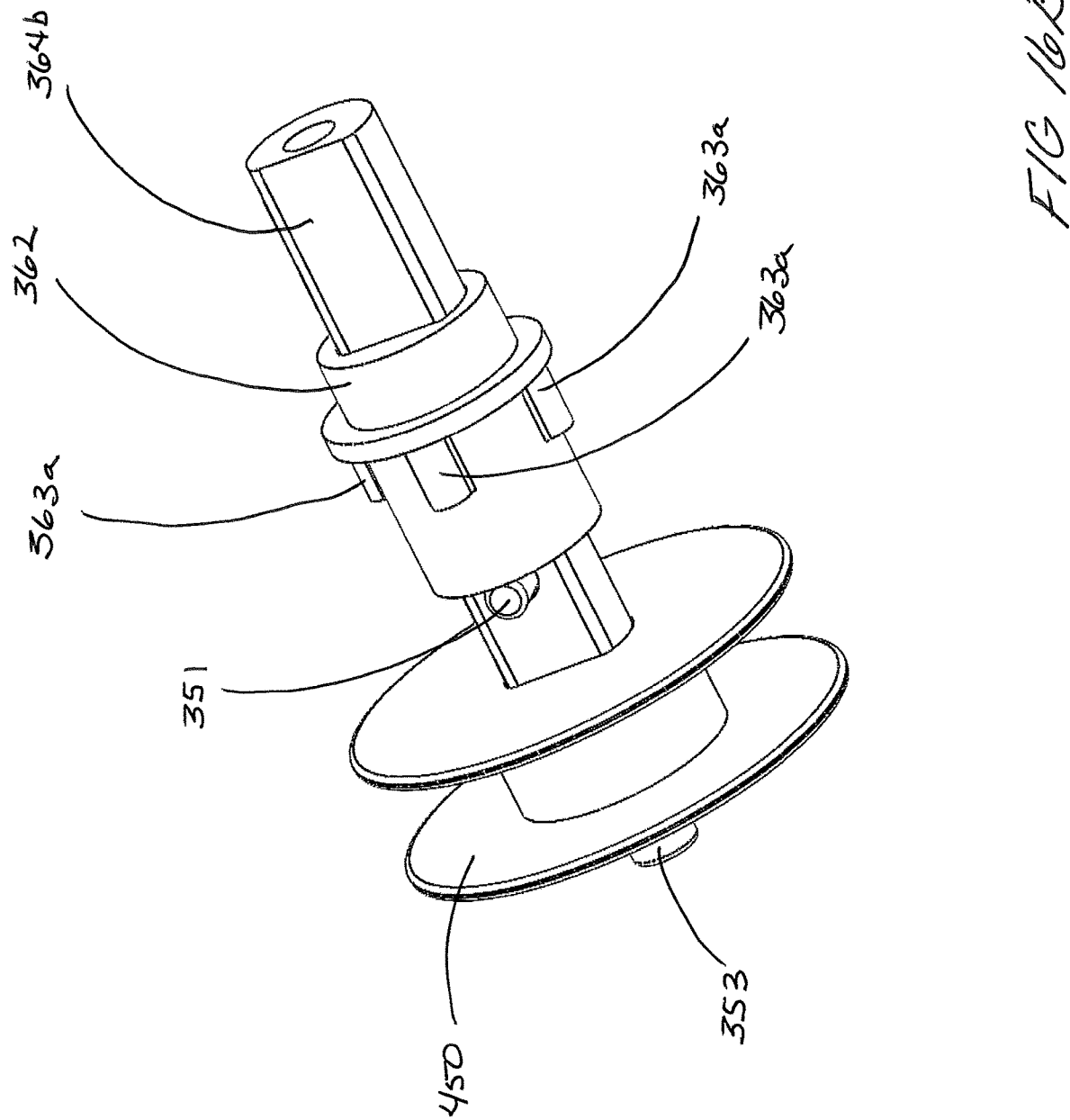

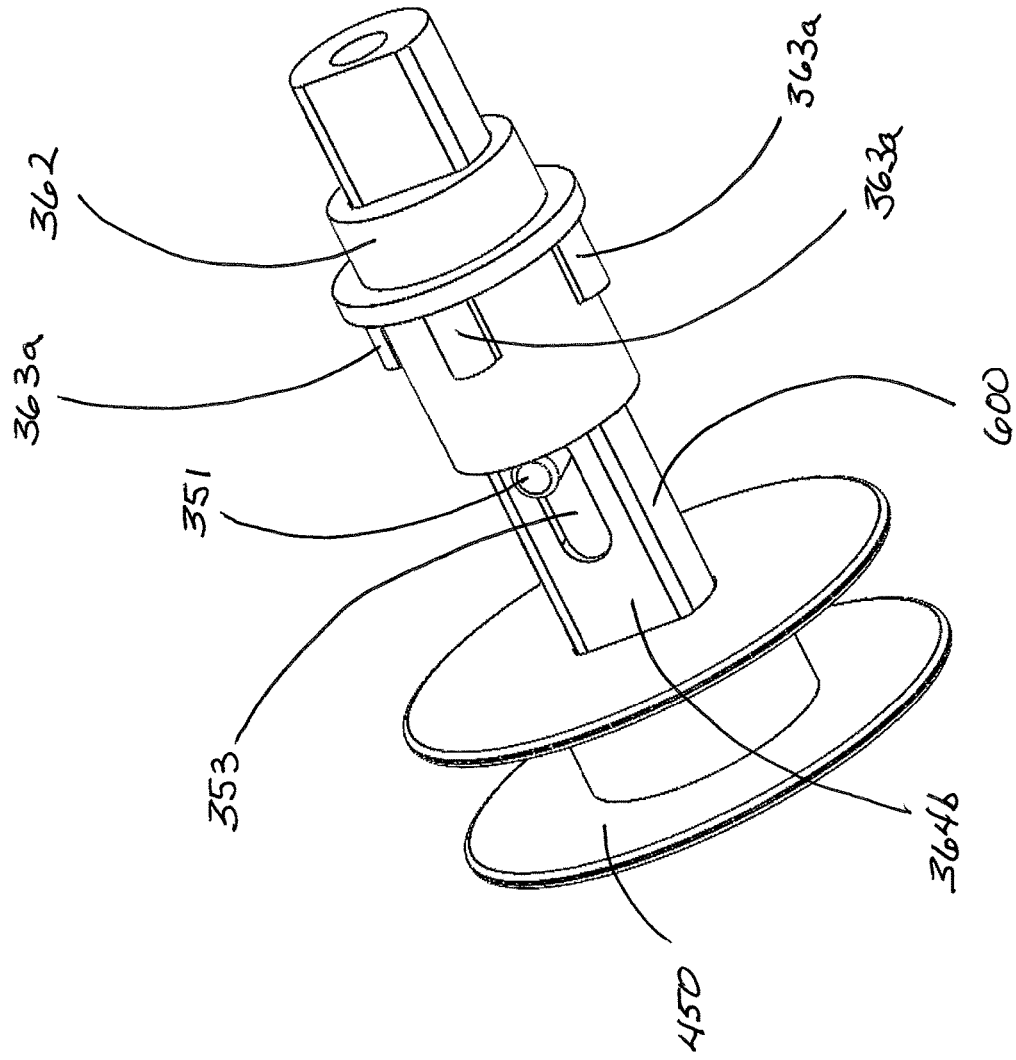

CROSSBOW WITH INTEGRAL COCKING WORM GEAR DRIVEN SPOOL

CROSS-REFERENCE TO RELATED APPLICATIONS

This is a continuation-in-part patent application which takes priority from patent application Ser. No. 16/812,874 filed on Mar. 9, 2020.

BACKGROUND OF THE INVENTION

1. Field of the Invention

The present invention relates generally to archery and more specifically to a crossbow with integral cocking and de-cocking assembly, which preferably includes a removable electric motor; and selectable coupling and de-coupling of a worm wheel gear of worm gear assembly from a supporting shaft that is coupled axial to a wheel gear.

3. Discussion of the Prior Art

It appears that the prior art does not teach or suggest a worm gear assembly with a feature that allows the de-coupling of the worm gear wheel from the wheel-supporting shaft, in order to allow free rotation of the shaft.

SUMMARY OF THE INVENTION

The enclosed invention discloses a crossbow, and more specifically a built in cocking mechanism for a crossbow that couples a worm gear with a spool, and may also be utilized with an optional built in, removable motor gearbox assembly and power source. The motor gearbox assembly may or may not have a clutch assembly, whereby the rotational force applied by the said motor gearbox assembly reaches a predetermined amount of force, the rotation of the main drive shaft ceases. A switch may be provided as to start, stop, and reverse the direction of rotation of the motor gearbox assembly, as well as switches and or circuits that may control operation of the motor gear set. A worm gear drive is provided having an external drive receiver and an internal worm gear drive assembly. The worm gear drive may be operably coupled to a spool, or may be integrated with the spool. The spool is operably coupled with a connecting means to connect the spool with a movable string latch assembly or string hook (string retainment device). The spool winds and unwinds the connecting means to and from the spool, allowing movement of the string retainment device. The motor gearbox assembly may be operably coupled with the internal worm gear drive assembly, selectable from an engagement position and a disengagement position.

In a disengaged position, and external drive force may be engaged with the external drive receiver. Rotation of the external drive force in a first direction causes the spool to unwind the connecting means allowing the movable string retainment device to move forward, and rotation of the external drive force in a second direction causes the spool to wind the connecting means allowing the movable string retainment device to move rearward.

In an engaged position, an internal drive force created by the motor gearbox assembly may be engaged with the internal worm gear drive assembly. Rotation of the internal drive force in a first direction causes the spool to unwind the connecting means allowing the string retainment device to move forward, and rotation of the internal drive force in a second direction causes the spool to wind the connecting means and moving the string retainment device to move rearward. An output shaft and drive gear of the motor gearbox assembly may be fixed relative to the motor gearbox, or may have a first position extended wherein the drive gear engages the internal worm gear drive assembly, and a second position retracted wherein the drive gear disengages the internal worm gear drive assembly.

In a first embodiment having a fixed drive shaft, the motor gearbox assembly is select-ably movable from a first disengaged position to a second engaged position. In a second embodiment, the motor gearbox assembly has a solenoid select-ably extending the drive gear and output shaft to an engaged position, and retracting the drive gear and output shaft to a disengaged position. In a third embodiment, direct drive is utilized coupling the worm gear shaft with an external rotational force. Electrical power may be internal, external, USB, or other methods known in the art of electrical energy supply and transmission.

Unique to the present invention is the ability to de-couple the worm gear wheel from the shaft and the spools, allowing the free rotation of the spools and the shaft, or the ability to de-couple the spools from the shaft and the worm wheel gear. This allows the spools to unwind without the need for rotating the worm gear, which makes it much easier for the user to cock the crossbow.

The utilization of a worm gear enables the rotation of the spool to cease as soon as rotational forces are removed from the worm gear, eliminating the need for a pawl, clutches, or any other secondary devices required to cease the rotation of the spool.

BRIEF DESCRIPTION OF THE DRAWINGS

FIG. 2 is an exploded perspective view of an integral cocking assembly of the present invention.

FIG. 3 is a perspective view of an integral cocking assembly having an external drive force engaged with the external drive force receiver of the present invention.

FIG. 4 is a perspective view of an integral cocking assembly having an external drive force engaged with an external drive force receiver of the present invention.

FIG. 5 is a perspective view of an integral cocking assembly of the present invention.

FIG. 6 is a perspective view of an integral cocking assembly having an external drive force receiver, and an internal drive gear, where a motor gearbox assembly is removed, with the worm gear drive assembly of the present invention.

FIG. 7 is a perspective view of a worm drive assembly having an external drive force receiver with a hand crank assembly of the present invention.

FIG. 8 is a perspective view of the assembly having an external drive force receiver of the present invention.

FIG. 9 is a perspective view of an integral cocking assembly having a motor gearbox assembly engaged with a worm gear drive assembly of the present invention.

FIG. 10 is a partially exploded perspective view of an integral cocking assembly having a motor gearbox assembly disengaged from a worm gear drive assembly of the present invention.

FIG. 11 is a perspective view of an alternate embodiment assembly having a motor gearbox assembly directly coupled with a worm gear drive assembly of the present invention.

FIG. 12 is an exploded view of components of the present invention.

FIG. 13 is an exploded view of components of the present invention.

FIG. 15 is a partial exploded view of components of the present invention.

FIG. 16B is partial view of a spool, a shaft, a de-coupling pin, and a de-coupler, wherein the de-coupler is in the first (engaged) position of the present invention.

FIG. 17B is partial view of a spool, a shaft, a de-coupling pin, and a de-coupler, wherein the de-coupler is in the second (disengaged) position of the present invention.

DETAILED DESCRIPTION OF THE INVENTION

Figure 1A:
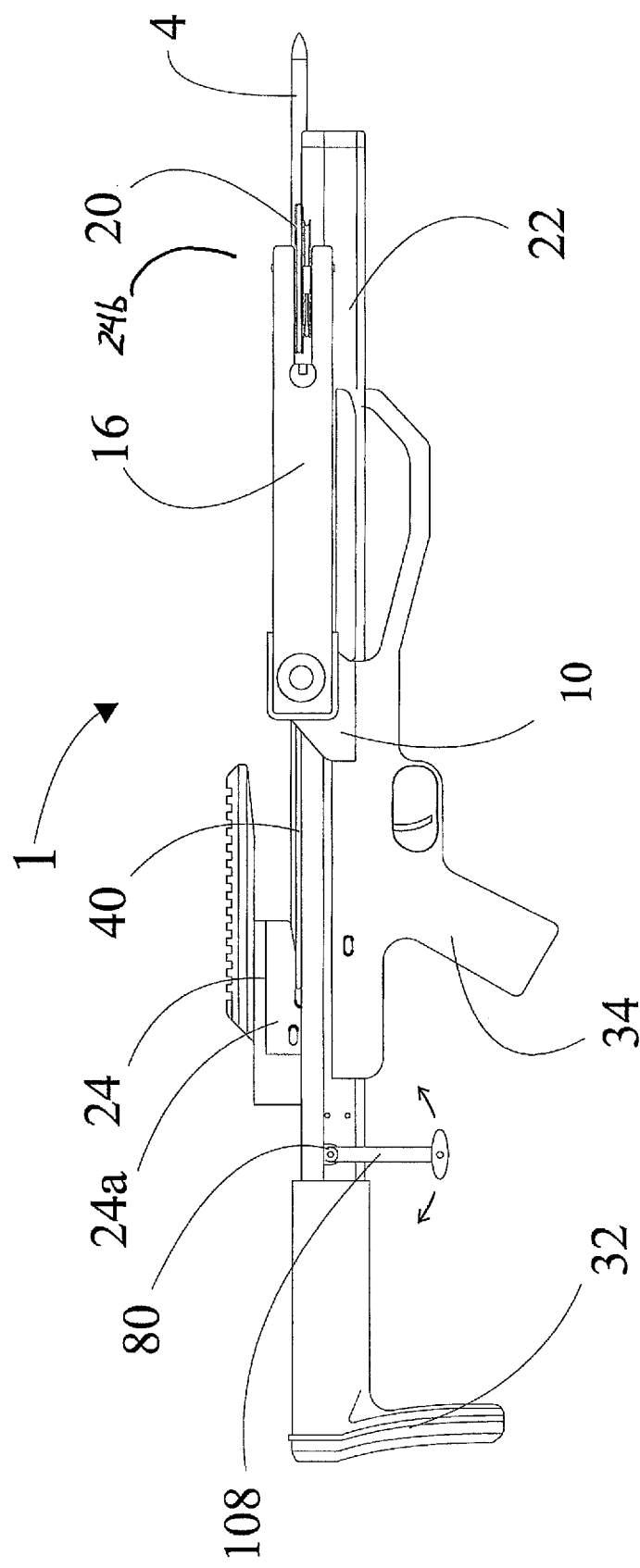
FIG. 1A is a side view of a crossbow with built in crank cocking device having a movable latch housing assembly in the cocked position of the present invention.
Figure 14:
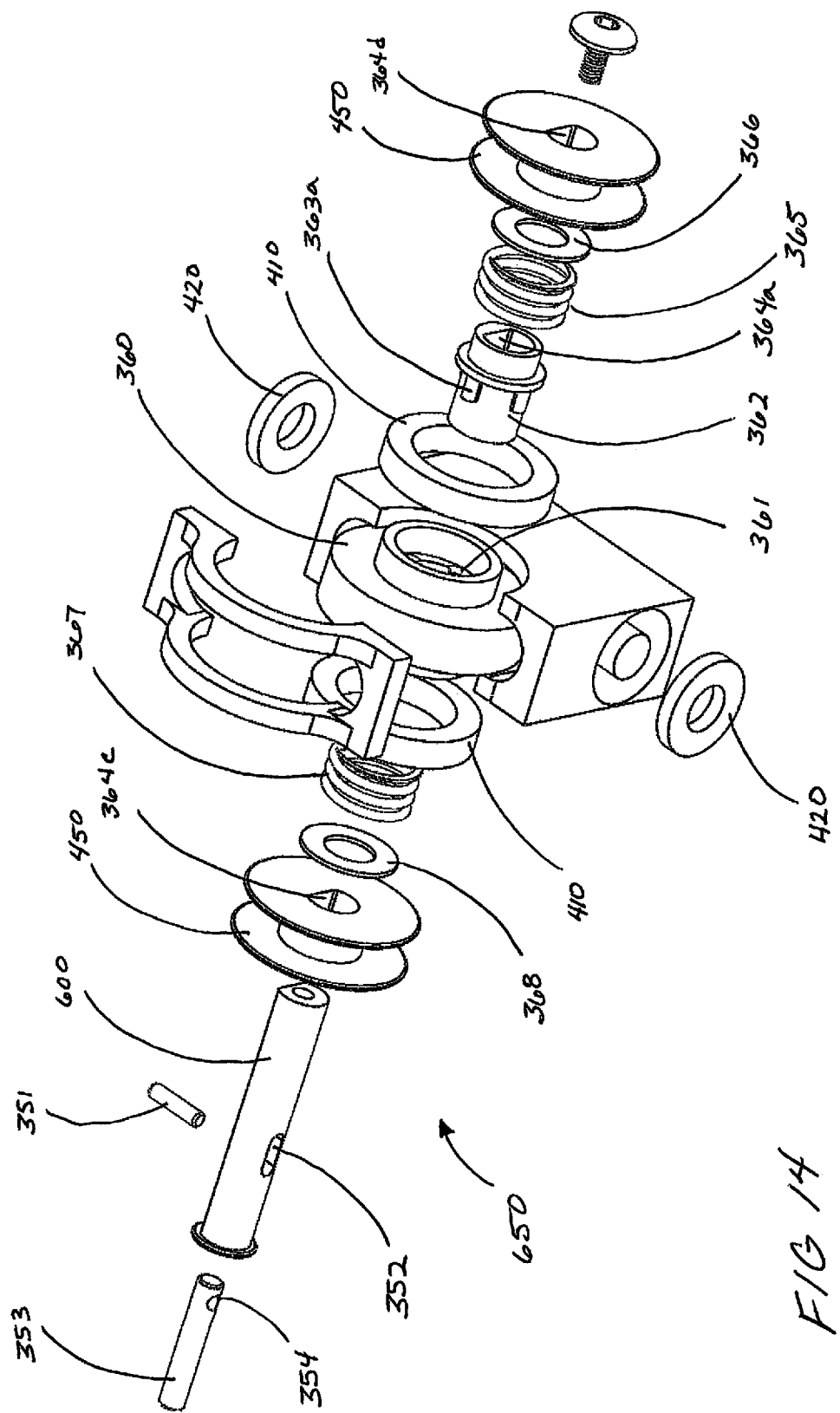
FIG. 14 is an exploded view of components and a housing of the present invention.
Figure 16A:
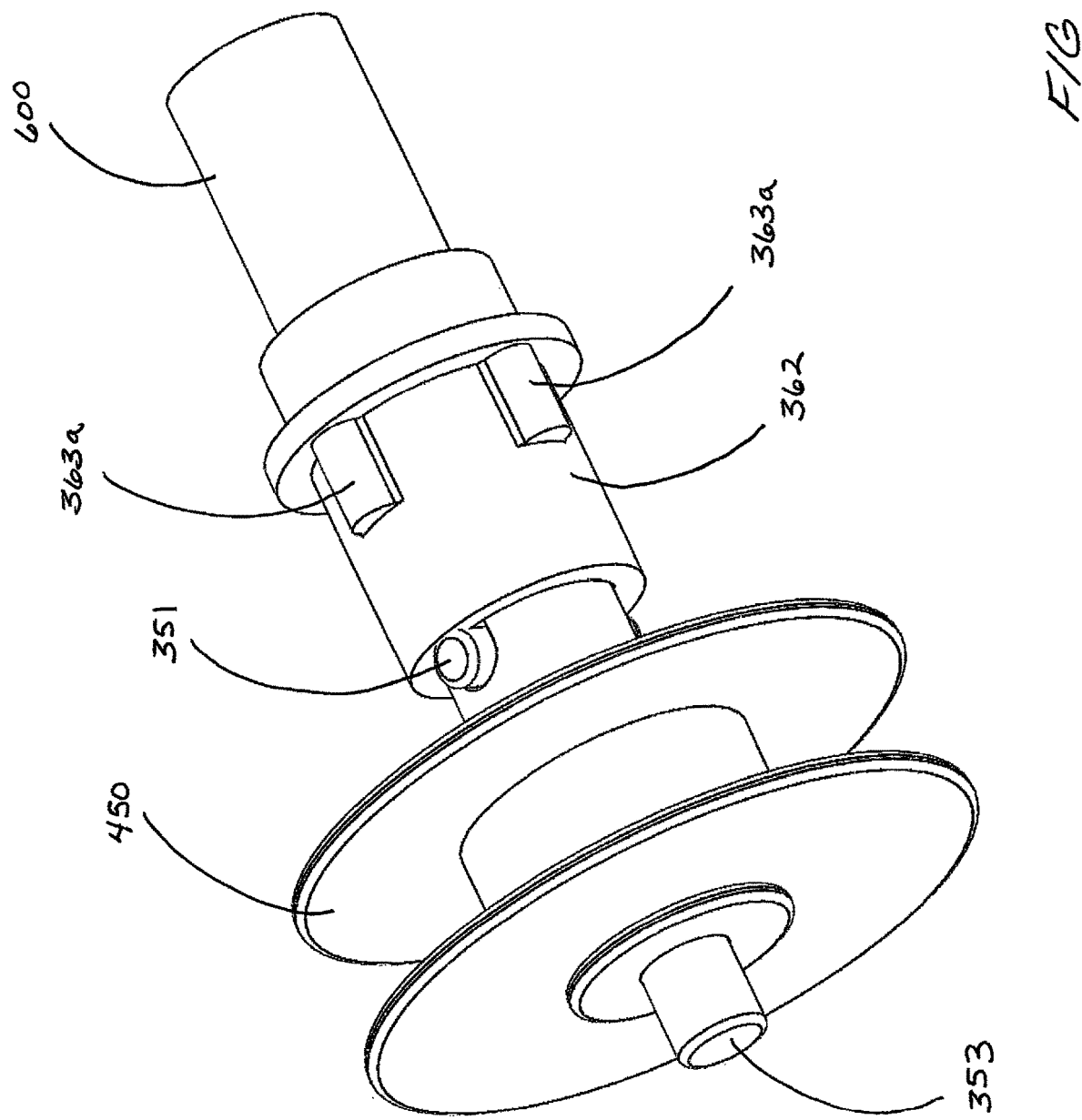
FIG. 16A is partial view of a spool, a shaft, a de-coupling pin, and a de-coupler, wherein the de-coupler is in the first (engaged) position of the present invention.
Figure 17A:
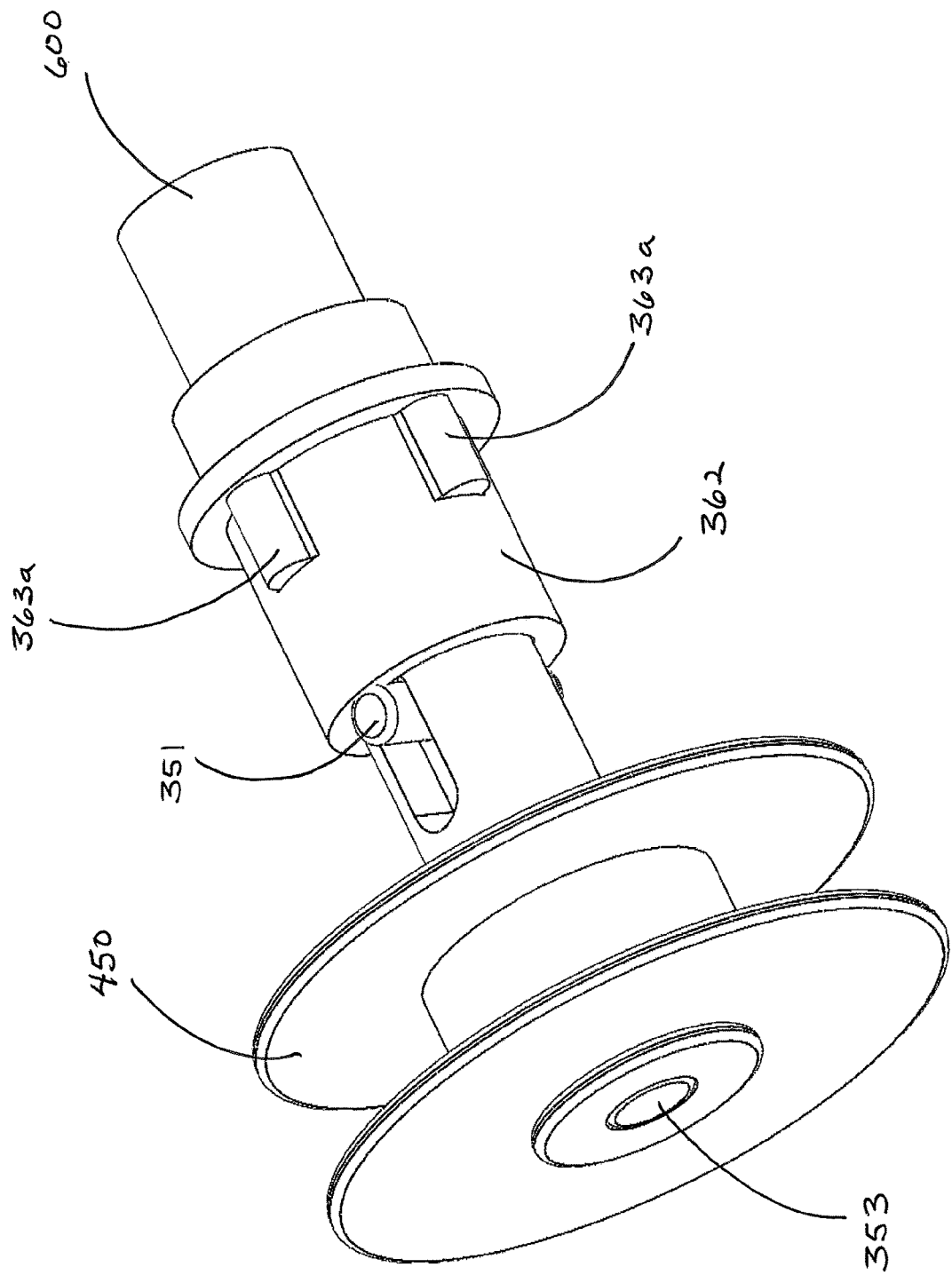
FIG. 17A is partial view of a spool, a shaft, a de-coupling pin, and a de-coupler, wherein the de-coupler is in the second (disengaged) position of the present invention.

With reference to FIG. 1A, the enclosed invention discloses a crossbow 1, having a butt stock 32, a hand grip 34, a riser 10, a string retainment device 24, and a hand crank 108. With reference to FIG. 2, the crossbow 1 includes a built-in cocking mechanism having a worm gear shaft 400, and worm wheel gear 360 which together with bearings 410 and 420 and support shaft 600 make a worm gear drive assembly 610, that may be utilized with a hand crank assembly 26 comprising a crank drive gear 340, support bearings 350, and an pinion gear 510 as shown in FIGS. 2 and 3, or an optional built in, removable motor gearbox assembly 28.

With reference to FIG. 9, the crossbow 1 uses of a hand crank 108 or a motor gearbox assembly 28 to power a worm gear assembly coupled with a spool 450. As shown in FIGS. 3-5, a hand crank 108 is coupled to a crank drive gear 340 mating to a pinion gear 510. The pinion gear 510 is coupled axially coupled with the worm gear shaft 400. As the hand crank 108 is turned, rotational forces of the hand crank drive gear 340 turn the pinion gear 510, in turn causing rotation of the worm gear shaft 400. As the worm gear shaft 400 rotates, it causes rotation of the worm wheel 360.

When in use, the hand crank 108 is turned a first direction, unwinding the connecting means 300 from the spool 450, allowing the string latch housing assembly 24 to move forward and engage the string 40. Once the string catch 120 is latched to the string 40, the hand crank 108 is rotated in a second direction, winding the connecting means 300 on the spool 450 until the string latch housing assembly 24 is in the ready-to-fire position. A trigger assembly is preferably used as a means to selectively release the string latch housing assembly in the ready-to-fire position.

As shown in FIGS. 6, 9, and 10, the worm gear shaft 400 is coupled to an internal drive gear 330. The internal drive gear 330 may be coupled and de-coupled with the motor gearbox assembly output drive gear 310.

The motor gearbox assembly 28 may or may not have a clutch assembly. When a clutch assembly is present, the rotational force applied by the motor gearbox 28 assembly reaches a predetermined amount of force, the rotation of the output shaft 320 ceases. A switch (not shown) may be provided as to start, stop, and reverse the direction of rotation of the motor gearbox assembly 28.

In use, a clutch assembly in the motor gear assembly 28 would prevent the string latch housing assembly 24 from traveling past the predetermined rearward position of the string latch housing assembly 24 during the cocking procedure. A micro-switch with electronic eye (not shown) may also be used to control the operation of the motor gear box assembly 28. The optional built-in, removable motor gearbox assembly 28 may take the place of the hand crank 108, without removal of the hand crank assembly 26.

Unique to the disclosed invention, is the use of a string retainment device 24 coupled with a spool 450, wherein the rotation of the spool is directly controlled by a worm wheel gear 360. The disclosed hand crank assembly 26 is preferred, however any such system utilizing a rotational force transferred to a worm gear assembly coupled with a spool which moves a string retainment device 24 from a first position 24a to a second position 24b, and again to a first position 24a.

Rotational forces applied to the worm gear drive assembly 610 causes the rotation of the spool 450. The spool 450 is coupled to a first end of a connecting means 300, the second end of the connecting means 300 is coupled to the string retaining means. The worm gear drive assembly 610 may operably couple the worm wheel gear 360 with the spool 450, or integrate the worm wheel gear 360 with the spool 450. As shown in FIGS. 10 and 11, an embodiment having an internal motor gearbox assembly 28 and an external drive force receiver 380.

As illustrated in FIGS. 3 and 5, a manual-only drive assembly 620 has a worm gear shaft 400 and a worm wheel gear 360, an external drive gear 340, and a pinion gear 510. The external drive gear 340 may be a manually driven gear, or a non-manually (powered) driven gear, and is coupled to the pinion gear 510. The pinion gear 510 is coupled with the worm gear shaft 400. Coupled too, or integrated with the worm wheel gear 360 is a spool 450. The spool 450 and the worm wheel gear 360 are supported by a shaft 600. The spool 450 is coupled to a connecting means 300 which coupled the spool 450 with the string latch housing 24. The external drive gear 340 has an external drive force receiver 380, sized to receive an external drive force. A segment of the hand crank 108 is coupled to the external drive force receiver 380. Rotation of the hand crank 108 a first direction unwinds the coupling means 300 from the spool 450 allowing forward movement of the string latch housing 24, and rotation of the hand crank 108 a second direction winds the coupling means 300 on the spool 450 moving the string latch housing 24 rearward. Because of the nature of a worm gear assembly 610, the hand crank 108 may be rotated and stopped at any time of the cocking sequence without the unwanted unwinding of the worm wheel gear 360 and spool 450.

When using the internal motor gearbox assembly 28 for rotational force, the hand crank 108 must be removed to prevent injury. As shown in FIGS. 9 and 10, an alternate embodiment 630 discloses a motor gearbox assembly 28 that is select-ably moveable from a first engaged position or a second disengaged position. The first engaged position allows a motor gearbox assembly drive gear 310 to engage the worm gear drive gear 330. The motor gearbox assembly 28 is selectable from a first rotational force direction and a second rotational force direction. The first rotational force direction unwinds the coupling means 300 from the spool 450 allowing forward movement of the string latch housing 24, and the second rotational force direction winds the coupling means 300 on the spool 450 moving the string latch housing 24 rearward.

An alternate embodiment discloses a motor gearbox assembly 28 that is stationary, having a solenoid (not shown) controlling movement of the motor gearbox assembly output shaft 320 and motor gearbox assembly drive gear 310, moveable from an first disengaged position or a second engaged position. The first position disengaged is rearward, and does not allow the motor gearbox assembly drive gear 310 to engage the worm gear drive gear 330. The second position engaged is forward, and allows the motor gearbox assembly drive gear 310 to engage the worm gear drive gear 330. The solenoid is select-ably activated by the supply of electrical current, and deactivated by the removal of electrical current.

An alternate embodiment disclosed by FIG. 8 has no motor gearbox assembly 28, and is operable only by an external rotational force, such as a hand crank 108, or other means such as an electric screw driver or similar, not shown. Further, an alternative external drive force receiver 550 may be coupled with the worm gear shaft 400 to drive the worm wheel gear 360.

As shown in FIG. 11, the motor gearbox assembly 28 may be directly coupled to the worm gear shaft 400.

The string retainment device 24 may be positioned in the cocked proximal position 24A by the connecting means 300 until fired, or without the connecting means 300, as by a string retainment device block not shown.

Though the preferred embodiment discloses a certain type of external drive gear 340 and pinion gear 510 to rotate the worm gear shaft 400, any type of gear assembly known in the art may be used to rotate the worm gear shaft 400. Such alterations may be the removal of the motor gearbox assembly 28, the use of an external powered rotational force device powering the rotation of the worm gear drive gear 330, or any combination thereof. The motor gearbox assembly 28 may be fixed, slide-able, removable, or external.

With reference to FIGS. 12-17B, the present invention has the unique ability to de-couple the worm gear wheel 360 from the shaft 600 that the spools 450 are coupled to, allowing the free rotation of the spools 450 and the shaft 600. This allows the spools 450 to unwind without the need for rotating the worm gear wheel 360, which makes it much easier for the user to cock the crossbow.

In the preferred embodiment, an assembly 660 has a worm gear 400 and a worm gear wheel 360 are operably coupled and retained relative to one another. Supported by bearings 410 or the like, the worm gear wheel 360 is operably coupled with a shaft 600, a coupler 362, a de-coupling shaft 353, a de-coupling shaft retention pin 351, and at least one spool 450. The shaft 600 has a flat indexing surface 364b; the at least one spool 450 has a flat indexing surface 364d; the coupler 362 has a flat indexing surface 364a; wherein the flat indexing surface 364b of the shaft 600 operably engages and retains the at least one spool 450, and the coupler 362. The coupler 362 has an indexed worm gear wheel interface surface 363a, and the worm wheel gear 360 has an indexed coupler interface surface 361, wherein the surfaces are sized to select-ably and operably engage one another. The coupler spring 365 is biased to engage the coupler 362 with the worm gear wheel 360, and when engaged, or coupled, the coupler 362 locks the worm gear wheel 360 with the shaft 600 and the at least one spool 450. When the coupler 362 is locked with the worm gear wheel 360, the user may cause the rotation of the worm gear 400, which in turn rotates the worm gear wheel 360, the shaft 600, and the at least one spool 450. It is in this locked position that the user may cause the winding or unwinding of the chord from the at least one spool 450 in order to cock or de-cock the crossbow 1.

When the crossbow 1 in in the at-rest or uncocked position, the user may depress the de-coupling shaft 353, which causes the movement of the coupler 362 from a first position (locked) to a second position (un-locked) to allow the free rotation of the at least one spool 450. When the de-coupling shaft 353 is released, the coupler spring 365 biases the coupler 362 back into the first position (locked) as soon as the indexed worm gear wheel interface surface 363a is aligned with the worm wheel gear indexed coupler interface surface 361.

It is to be understood that one or two spools may be used with the invention. It is to be understood that any form of connecting material may be used to couple the spool(s) with the string engagement means. It is to be understood that any type of means may be utilized to move the coupler from a first position to a second position, such as a lever, a fork, or the like. It is also to be understood that, thought the preferred embodiment utilizes a coupler to lock and unlock the worm gear wheel from the shaft and spools, an alternative embodiment having a similar coupler may lock and unlock the spool(s) from the shaft and worm gear wheel.

Further, it is to be understood that embodiments of the disclosure may be used to draw the bowstring in any method known in the arts, such as a sled, hooks, fingers, moving latch assembly, moving trigger assembly, and the like.

Finally, it is to be understood that the coupler-locking-unlocking of a worm gear wheel disclosed herein may be used in any device that may benefit from the disclosure.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A worm gear assembly comprising:
   a coupler having an outside indexed surface and an inner flat indexing surface;
   a spool shaft includes a spool shaft outer perimeter, a disengagement inner perimeter and a pin slot, said spool shaft outer perimeter is sized to be received by said inner flat indexing surface, said spool shaft rotates with said coupler, said pin slot is formed in said spool shaft;
   a worm wheel gear having an inner indexing surface sized to slidably receive said outside indexed surface, wherein said coupler is driven by said worm wheel gear in a first axial position on said spool shaft, said coupler is not driven by said worm wheel gear in a second axial position on said spool shaft;
   a spool includes a spool shaft inner perimeter, said spool shaft inner perimeter is sized to receive said spool shaft outer perimeter, said spool rotates with said spool shaft;
   a biasing device forces said outside indexed surface to engage said inner indexing surface in said first axial position;
   a disengagement shaft includes a pin hole; and
   a disengagement pin is inserted through said pin slot and said pin hole, wherein an end of said disengagement shaft is axially pushed relative to said spool shaft to move said coupler from said first axial position to said second axial position.

2. The worm gear assembly of claim 1, further comprising:
a worm gear for driving said worm wheel gear.

3. The worm gear assembly of claim 2, further comprising:
a hand crank for driving said worm gear.

4. The worm gear assembly of claim 2, further comprising:
a hand crank with a clutch for driving said worm gear.

5. The worm gear assembly of claim 2, further comprising:
a powered device for driving said worm gear.

6. A worm gear assembly comprising:
a coupler having an outside indexed surface and an inner flat indexing surface;
a spool shaft includes a spool shaft outer perimeter, a disengagement inner perimeter and a pin slot, said spool shaft outer perimeter is sized to be received by said inner flat indexing surface, said spool shaft rotates with said coupler, said pin slot is formed in said spool shaft;
a worm wheel gear having an inner indexing surface sized to slidably receive said outside indexed surface, wherein said coupler is driven by said worm wheel gear in a first axial position on said spool shaft, said coupler is not driven by said worm wheel gear in a second axial position on said spool shaft;
a spool includes a spool shaft inner perimeter, said spool shaft inner perimeter is sized to receive said spool shaft outer perimeter, said spool rotates with said spool shaft; and
a biasing device forces said outside indexed surface to engage said inner indexing surface in said first axial position;
a disengagement shaft is axially pushed relative to said spool shaft to move said coupler from said first axial position to said second axial position.

7. The worm gear assembly of claim 6, further comprising:
a worm gear for driving said worm wheel gear.

8. The worm gear assembly of claim 7, further comprising:
a hand crank for driving said worm gear.

9. The worm gear assembly of claim 7, further comprising:
a hand crank with a clutch for driving said worm gear.

10. The worm gear assembly of claim 7, further comprising:
a powered device for driving said worm gear.

11. A worm gear assembly comprising:
a coupler having an outside indexed surface and an inner flat indexing surface;
a spool shaft includes a spool shaft outer perimeter, a disengagement inner perimeter and a pin slot, said spool shaft outer perimeter is sized to be received by said inner flat indexing surface, said spool shaft rotates with said coupler, said pin slot is formed in said spool shaft;
a worm wheel gear having an inner indexing surface sized to slidably receive said outside indexed surface, wherein said coupler is driven by said worm wheel gear in a first axial position on said spool shaft, said coupler is not driven by said worm wheel gear in a second axial position on said spool shaft;
a spool includes a spool shaft inner perimeter, said spool shaft inner perimeter is sized to receive said spool shaft outer perimeter, said spool rotates with said spool shaft; and
a disengagement shaft is axially pushed relative to said spool shaft to move said coupler from said first axial position to said second axial position.

12. The worm gear assembly of claim 11, further comprising:
a worm gear for driving said worm wheel gear.

13. The worm gear assembly of claim 12, further comprising:
a hand crank for driving said worm gear.

14. The worm gear assembly of claim 12, further comprising:
a hand crank with a clutch for driving said worm gear.

15. The worm gear assembly of claim 12, further comprising:
a powered device for driving said worm gear.

* * * * *